US010773723B2

(12) United States Patent
Fu

(10) Patent No.: US 10,773,723 B2
(45) Date of Patent: Sep. 15, 2020

(54) METHOD AND DEVICE FOR ADAPTING A VEHICLE VELOCITY FOR A VEHICLE

(71) Applicant: Robert Bosch GmbH, Stuttgart (DE)

(72) Inventor: Chengxuan Fu, Kirchheim (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 15/550,662

(22) PCT Filed: Jan. 15, 2016

(86) PCT No.: PCT/EP2016/050781
§ 371 (c)(1),
(2) Date: Aug. 11, 2017

(87) PCT Pub. No.: WO2016/134879
PCT Pub. Date: Sep. 1, 2016

(65) Prior Publication Data
US 2018/0037232 A1 Feb. 8, 2018

(30) Foreign Application Priority Data
Feb. 24, 2015 (DE) .................. 10 2015 203 270

(51) Int. Cl.
B60W 30/00 (2006.01)
B60W 30/18 (2012.01)
B60W 30/14 (2006.01)
B60W 10/20 (2006.01)

(52) U.S. Cl.
CPC ...... B60W 30/18145 (2013.01); B60W 10/20 (2013.01); B60W 30/143 (2013.01); B60W 2520/10 (2013.01); B60W 2540/18 (2013.01); B60W 2552/30 (2020.02); B60W 2710/202 (2013.01); B60W 2720/10 (2013.01)

(58) Field of Classification Search
None
See application file for complete search history.

(56) References Cited

U.S. PATENT DOCUMENTS

| 5,978,731 | A | 11/1999 | Matsuda | |
|---|---|---|---|---|
| 6,311,123 | B1 * | 10/2001 | Nakamura | B60K 31/0008 123/352 |
| 9,091,558 | B2 * | 7/2015 | Su | G01C 21/34 |
| 9,327,765 | B2 * | 5/2016 | Takeda | B62D 6/003 |
| 9,421,973 | B2 * | 8/2016 | Lee | B62D 15/025 |

(Continued)

FOREIGN PATENT DOCUMENTS

| CN | 101607554 A | 12/2009 |
|---|---|---|
| EP | 2516194 B1 | 12/2014 |

(Continued)

OTHER PUBLICATIONS

International Search Report for PCT/EP2016/050781, dated Mar. 21, 2016.

Primary Examiner — Truc M Do
(74) Attorney, Agent, or Firm — Norton Rose Fulbright US LLP; Gerard Messina

(57) ABSTRACT

A method for adapting a vehicle velocity of a vehicle, the method including determining a required steering torque for guiding the vehicle along a curved driving trajectory, and ascertaining a permissible velocity of the vehicle for guiding the vehicle along the curved driving trajectory using the required steering torque and an available steering torque.

12 Claims, 2 Drawing Sheets

(56) References Cited

U.S. PATENT DOCUMENTS

| | | | |
|---|---|---|---|
| 9,604,667 B2 * | 3/2017 | Noh | B62D 5/0487 |
| 9,625,910 B2 * | 4/2017 | Choi | G05D 1/021 |
| 9,643,600 B2 * | 5/2017 | Takahashi | B60T 7/12 |
| 9,669,831 B2 * | 6/2017 | Park | B60W 30/14 |
| 9,852,633 B2 * | 12/2017 | Igarashi | G08G 1/166 |
| 9,969,389 B2 * | 5/2018 | Stephens | B60W 30/12 |
| 2002/0013647 A1 * | 1/2002 | Kawazoe | B62D 1/28 701/41 |
| 2005/0240334 A1 * | 10/2005 | Matsumoto | B60K 31/0083 701/93 |
| 2009/0057065 A1 * | 3/2009 | Akaki | B60T 7/126 187/223 |
| 2009/0240389 A1 * | 9/2009 | Nomura | B62D 5/046 701/31.4 |
| 2013/0060413 A1 * | 3/2013 | Lee | B62D 1/286 701/23 |
| 2013/0190982 A1 * | 7/2013 | Nakano | B62D 15/025 701/41 |
| 2013/0190984 A1 * | 7/2013 | Kawai | B62D 6/00 701/41 |
| 2013/0190985 A1 * | 7/2013 | Nakano | B62D 6/00 701/41 |
| 2013/0274985 A1 * | 10/2013 | Lee | B62D 15/025 701/23 |
| 2014/0257640 A1 * | 9/2014 | Mitsumoto | B62D 15/025 701/41 |
| 2014/0371988 A1 * | 12/2014 | Muramatsu | B60W 40/105 701/41 |
| 2015/0151725 A1 * | 6/2015 | Clarke | B60W 30/00 701/28 |

FOREIGN PATENT DOCUMENTS

| | | |
|---|---|---|
| JP | H09254678 A | 9/1997 |
| JP | 2005343184 A | 12/2005 |
| JP | 2006137263 A | 6/2006 |
| JP | 2007038702 A | 2/2007 |

* cited by examiner

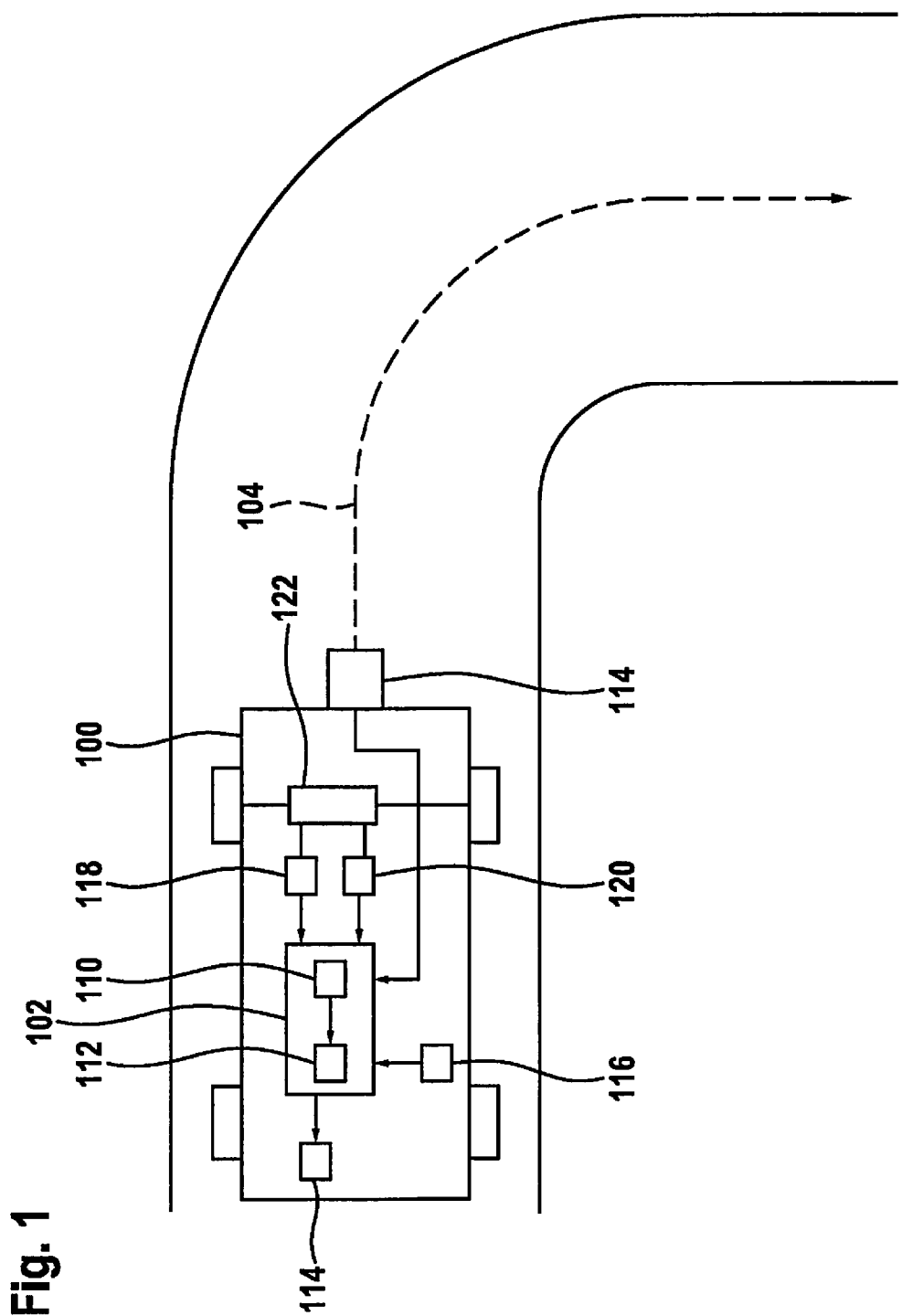

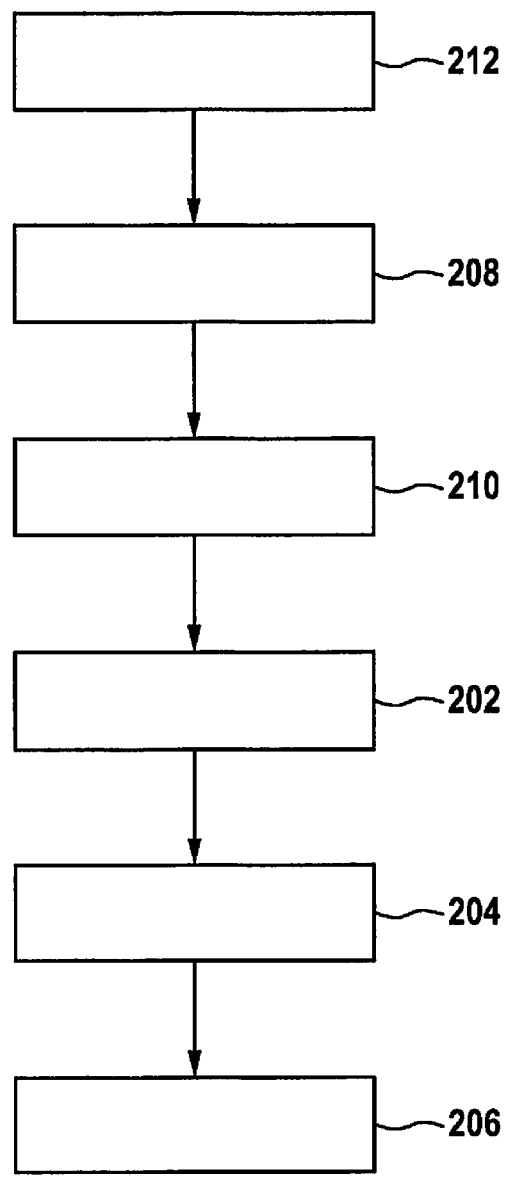

METHOD AND DEVICE FOR ADAPTING A VEHICLE VELOCITY FOR A VEHICLE

FIELD OF THE INVENTION

The present invention relates to a method for adapting a vehicle velocity for a vehicle, to a corresponding device and a corresponding computer program.

BACKGROUND INFORMATION

In current lane-keeping support systems (LKS: lane keeping support) with steering assistance, the steering torque requested by the system is limited in terms of its amount, usually to 3 Nm, in order to allow the driver to override the system at all times, in particular in case of possible incorrect interventions.

SUMMARY OF THE INVENTION

Against this background, the approach introduced here presents a method for adapting a vehicle velocity for a vehicle, as well as a device that uses this method and finally, a corresponding computer program according to the main claims. Advantageous further refinements result from the respective dependent claims and from the following description.

The present method may advantageously be used for regulating the vehicle velocity in connection with driver assistance systems such as a lane-keeping assistant.

A corresponding method for adapting a vehicle velocity for a vehicle encompasses the following steps:

Determining a required steering torque for guiding the vehicle along a curved driving trajectory; and Ascertaining a permissible velocity of the vehicle for guiding the vehicle along the curved driving trajectory using the required steering torque and an available steering torque.

The driving trajectory may characterize a movement path of the vehicle lying in front of the vehicle in the direction of travel, or it may characterize a section of such a movement path. The required steering torque could be a steering torque that must be applied to the steerable wheels of the vehicle in order to guide the vehicle along the driving trajectory. The required steering torque may increase with increasing velocity of the vehicle, possibly making it necessary to reduce the current velocity of the vehicle in order to safely guide the vehicle along the curved driving trajectory. The available steering torque may be a steering torque that is able to be applied under the circumstances in order to steer the vehicle. According to specific embodiments of the described approach, a limitation of a steering torque requested by a driver assistance system may be canceled or reduced, so that the lane-keeping system is also able to request a steering torque required for more pronounced curves on country roads.

The present method may include a step of supplying a control signal for reducing the velocity of the vehicle when a current velocity of the vehicle exceeds the permissible velocity. To do so, a value representing the current velocity of the vehicle may be compared with a value representing the permissible velocity. If the current velocity is considered to be excessive, the vehicle is able to be decelerated to such an extent that the vehicle is able to follow the driving trajectory in a safe manner.

In the step of supplying, the control signal is unable to be supplied if a steering torque provided by a driver of the vehicle is detected in a step of detecting and a direction of the steering torque supplied by the driver runs counter to a direction of the required steering torque. In this way a reduction of the velocity may be avoided in the event that the action of the driver leads to the conclusion that the vehicle is not meant to follow the curved driving trajectory. For example, avoiding the deceleration may be expedient if it is recognized, based on a steering intervention by the driver, that the driver is intent on starting a passing maneuver.

The method may include a step of detecting a setpoint traffic lane that lies in front of the vehicle in the direction of travel as the curved driving trajectory. Suitable sensor signals or signals from a digital map may be read in and evaluated in order to detect the setpoint traffic lane. In this way, a current driving trajectory may be available at all times.

In the step of detecting, a maximum change in a radius of curvature of the curved driving trajectory, or a minimum radius of curvature of the curved driving trajectory is able to be detected. In the step of determining, the required steering torque may be determined using the maximum change or the minimum radius of curvature, thereby making it possible to examine the particular regions of the driving trajectory that most likely will require the application of the greatest steering torque.

The method may include a step of determining the available steering torque as a maximum steering torque that is able to be supplied by a steering assistance device of the vehicle. A value of the maximum steering torque may be read in via a suitable interface, thereby allowing the method to be adapted to different vehicle types. In addition, in case of a malfunction of the steering assistance device, a timely response is able to take place, for instance by decelerating the vehicle.

In the step of determining, the available steering torque is determinable as a combination of the maximum steering torque able to be supplied by the steering assistance device of the vehicle and a steering torque able to be supplied by a driver of the vehicle. This may be done when a steering torque supplied by the driver of the vehicle is detected in a step of detecting. In this way it is possible to avoid a limitation of the steering torque to the maximum steering torque able to be supplied by the steering assistance device of the vehicle.

Furthermore, the approach introduced here provides a device for adapting a vehicle velocity for a vehicle, the device being configured to execute, trigger or implement the steps of a variant of a method introduced here in corresponding devices. This specific variant of an embodiment of the present invention in the form of a device is likewise able to achieve the objective on which the present invention is based in a rapid and efficient manner.

In this particular case, a device may be understood as an electrical device which processes sensor signals and outputs control and/or data signals as a function of such processing. The device may include an interface that may be developed in the form of hardware and/or software. In the case of a hardware design, the interfaces could be part of what is known as a system ASIC, for example, which includes a variety of functions of the device. However, it is also possible for the interfaces to be discrete integrated switching circuits or to be at least partially made up of discrete components. In the case of a software design, the interfaces may be software modules provided on a microcontroller, for example, in addition to other software modules.

Also advantageous is a computer program product or a computer program having program code that may be stored on a machine-readable carrier or on a storage medium such as a semiconductor memory, a hard disk memory, or an optical memory and that is used for executing, implementing and/or triggering the steps of the present method as recited in one of the afore-described specific embodiments, in particular when the program product or the program is running on a computer or a device.

In the following text, the approach introduced here will be elucidated by way of example with the aid of the appended drawing.

BRIEF DESCRIPTION OF THE DRAWINGS

FIG. 1 shows a schematic illustration of a vehicle having a device for adapting a vehicle velocity according to an exemplary embodiment of the present invention.

FIG. 2 shows a flow diagram of a method for adapting a vehicle velocity according to an exemplary embodiment of the present invention.

DETAILED DESCRIPTION

The following description of advantageous exemplary embodiments of the present invention uses identical or similar reference numerals for the elements that are shown in the various figures and have a similar effect, and a repeated description of these elements is omitted.

FIG. 1 shows a schematic illustration of a vehicle 100 having a device 102 for adapting a vehicle velocity of vehicle 100 according to an exemplary embodiment of the present invention. Vehicle 100 is traveling in a traffic lane along a driving trajectory 104. Driving trajectory 104 initially includes a straight section that transitions into a curved section. Negotiating the transition from the straight section to the curved section and traveling the curved section requires a steering torque that is acting on the wheels of vehicle 100 in order to be able to keep vehicle 100 on driving trajectory 104.

According to an exemplary embodiment, device 102 includes a determination device 110 and an ascertainment device 112. Determination device 110 is developed to determine a required steering torque for guiding vehicle 100 along driving trajectory 104.

Ascertainment device 112 is configured to ascertain a permissible velocity for guiding the vehicle along driving trajectory 104, using one value for the required steering torque and one value for the available steering torque.

According to a specific embodiment, device 102 is developed to transmit a value representing the permissible velocity of the vehicle to an adjustment device 114 for adjusting a velocity of vehicle 100. Adjustment device 114 is configured to compare a value of a current velocity of the vehicle with the value for the permissible velocity, and to supply a control signal for reducing the current speed in the event that the current velocity is greater than the permissible velocity. Adjustment device 114 may thus be developed to adapt the current velocity to the permissible velocity, meaning that the current velocity is also able to be increased as the case may be.

According to an exemplary embodiment, device 102 is developed to receive values representing driving trajectory 104 by way of an interface. According to an alternative exemplary embodiment, device 102 is configured to ascertain values that represent driving trajectory 104. To do so, device 102 is configured to receive, via an interface, signals from an environment detection device 116 or from a navigation system 118, for instance, and to use these values for ascertaining driving trajectory 104. Device 102 is developed to determine a steering torque that is required to guide vehicle 100 along driving trajectory 104 using a rule assignment, for example.

According to an exemplary embodiment, device 102 is configured to determine the available steering torque using values received by device 102 via an interface to a manual steering mechanism 118, such as a steering wheel operable by the driver, and additionally or alternatively, via an interface to a steering assistance device 120. With the aid of manual steering mechanism 118 and steering assistance device 120, steering torques are able to be applied to a steering device 122 of vehicle 100, via which the steerable wheels of vehicle 100 are able to be turned or kept in a turned position. For example, device 102 is configured to add the steering torque supplied, or able to be supplied, by the driver to a steering torque able to be supplied by steering assistance device 120 in order to determine the available steering torque that is able to be supplied when traveling driving trajectory 104.

In the following text, exemplary embodiments of the present invention will be described in detail with the aid of FIG. 1.

According to an exemplary embodiment, the described approach allows for an adaptation, and additionally or alternatively, for a regulation of the longitudinal vehicle velocity on the basis of a predicted curvature of the setpoint traffic lane, which has been drawn in as driving trajectory 104 in FIG. 1, as well as on the basis of a maximally available steering torque of a lane keeping assistance system that may include steering assistance device 120, for example, and furthermore, with the aid of a driver-hand torque that the driver is able to supply via manual steering mechanism 118, for instance.

With the aid of different sensors 114 such as cameras, radar or GPS sensors, a system that includes device 102 is able to detect the curvature of the traffic lane as well as its change in curvature, or in other words, relevant parameters or values of driving trajectory 104.

Through the use of Clothoid models, device 102 according to an exemplary embodiment is able to predict the curvature of driving trajectory 104 in a look-ahead distance. The look-ahead distance is advantageously able to be calculated by multiplying the vehicle velocity with a look-ahead time assigned to the look-ahead distance. The look-ahead time is required to compensate for the latency time as well as the inertia of vehicle 100.

According to an exemplary embodiment, when calculating the curvature of driving trajectory 104, it is also taken into account whether vehicle 100 is to drive along the center line of the ego-lane or is to follow some other trajectory, which may be required as a function of the situation, e.g., when the lateral control is to be started at the edge of the lane and vehicle 100 is to be guided back to the lane center. This may also be necessary when other objects, such as obstacles or vehicles on adjacent lanes, affect setpoint trajectory 104.

According to an exemplary embodiment, device 102 is developed to determine the maximally permissible longitudinal vehicle velocity (Vmax), given knowledge of the predicted curvature of vehicle setpoint trajectory 104 (Kappapred) and maximally available lane-keeping assistance system steering torque (MLKSmax), in the form of an estimate and in the following manner:

$$V\text{max}=\text{sqrt}(MLKS\text{max}/K\text{appapred}/\text{factor}K).$$

In the simplest form, factorK is a constant and is able to be parameterized according to the vehicle.

However, if the driver then drives along with the lane-keeping assistance system, i.e. the driver steers in the same direction as the lane-keeping assistance system or in a correct direction predicted by the lane-keeping assistance system, then the maximally available steering torque (Mmax) is obtained as follows:

$$Mmax = MLKSmax + Mdriver$$

The calculation for the vehicle velocity (Vmax) is then carried out using the maximally available steering torque (Mmax).

If the driver steers strongly against the system, the system will be switched off according to an exemplary embodiment.

The vehicle velocity (Vmax) is then forwarded to the longitudinal control of vehicle 100, e.g., to an adaptive cruise control (ACC), which may be schematically represented by adjustment device 114 in FIG. 1. The adaptive cruise control is configured to regulate the vehicle velocity in such a way that the maximally permissible longitudinal vehicle velocity (Vmax) will not be exceeded, e.g., by actuating the drive of vehicle 100 and/or the brakes of vehicle 100.

This ensures that the maximum lane-keeping assistance system torque, which may be supplied by steering assistance device 120, for example, will not be exceeded since the lateral acceleration of vehicle 100 lies within the corresponding limit.

In addition, an offset may be deducted from the maximally available lane-keeping assistance system torque (MLKSmax) during the calculation, so that the system still has a certain reserve in order to ensure that the maximally available lane-keeping assistance system steering torque (MLKSmax) will not be reached.

FIG. 2 shows a flow diagram of a method for adapting a vehicle velocity according to an exemplary embodiment of the present invention. The method is able to be used in connection with a device for adapting a vehicle velocity of a vehicle, as it is described with the aid of FIG. 1.

The present method includes a step 202 of determining, in which a required steering torque for guiding the vehicle along a curved driving trajectory is determined; it also includes a step 204 of ascertaining, in which a permissible velocity for guiding the vehicle along the curved driving trajectory is ascertained using the required steering torque and an available steering torque.

According to different exemplary embodiments, the present method has one or more optional step(s) 206, 208, 210. For example, in an optional step 206, a control signal is supplied, which induces a velocity reduction of the vehicle if a current velocity of the vehicle is greater than the permissible velocity. In an optional step 208, a steering torque supplied by the driver of the vehicle is able to be detected. A value of the torque supplied by the driver may be used for detecting a driver-desired deviation from the predicted driving trajectory. Furthermore, in an optional step 210, the torque supplied by the driver of the vehicle is able to be used for determining the available steering torque. In an optional step 212, a setpoint traffic lane lying ahead of the vehicle in the direction of travel may be detected as the driving trajectory. In step 212, a maximum change of a radius of curvature of the driving trajectory or a minimum radius of curvature of the driving trajectory may furthermore be detected and used for determining the required steering torque in step 202.

If an exemplary embodiment includes an "and/or" linkage between a first feature and a second feature, then this should be interpreted as meaning that the exemplary embodiment according to a specific embodiment includes both the first feature and the second feature, and according to a further specific embodiment, includes either only the first feature or only the second feature.

What is claimed is:

1. A method for adapting a vehicle velocity for a vehicle, the method comprising:
   determining, by a processor, a required steering torque for guiding the vehicle along a curved driving trajectory;
   obtaining, by the processor, a maximum steering torque an automatic steering controller of the vehicle is able to apply;
   determining, by the processor, a present state of a manual steering controller controllable by a driver;
   based on the obtained maximum steering torque and the determined state of the manual steering controller, determining, by the processor, a maximum applicable steering torque;
   ascertaining, by the processor, a maximum permissible velocity of the vehicle at which the vehicle is guidable along the curved driving trajectory with application of the determined maximum applicable steering torque; and
   controlling the vehicle, by the processor, to reduce the vehicle velocity responsive to the ascertainment of the permissible velocity.

2. The method of claim 1, wherein the controlling is performed by supplying a control signal for reducing the velocity of the vehicle responsive to a current velocity of the vehicle being greater than the permissible velocity.

3. A method for adapting a vehicle velocity for a vehicle, the method comprising:
   determining, by a processor, a required steering torque for guiding the vehicle along a curved driving trajectory;
   ascertaining, by the processor, a maximum permissible velocity of the vehicle for guiding the vehicle along the curved driving trajectory using the required steering torque and an available steering torque;
   detecting, by the processor, a steering torque supplied by a driver of the vehicle; and
   responsive to a current velocity of the vehicle being greater than the permissible velocity and conditional upon a determination that a direction of the detected steering torque supplied by the driver does not run counter to a direction of the required steering torque, supplying, by the processor, a control signal to reduce the vehicle velocity.

4. The method of claim 1, further comprising:
   detecting a setpoint traffic lane lying ahead of the vehicle in a direction of travel as the curved driving trajectory.

5. The method of claim 4, wherein in the detecting, a maximum change of a radius of curvature of the curved driving trajectory or a minimum radius of curvature of the curved driving trajectory is detected, and in the step of determining, the required steering torque is determined using the maximum change or the minimum radius of curvature.

6. The method of claim 1, wherein the determining of the present state of the manual steering controller includes determining whether the manual steering controller is being controlled, and the determining of the maximum applicable steering torque includes, responsive to a result of the determination being that the manual steering controller is being controlled, combining (a) the maximum steering torque that the automatic steering controller of the vehicle is able to apply and (b) a steering torque able to be supplied by the driver control of the manual steering controller.

7. A device for adapting a vehicle velocity for a vehicle, comprising:
a hardware processor configured to:
determine a required steering torque for guiding the vehicle along a curved driving trajectory;
obtain a maximum steering torque an automatic steering controller of the vehicle is able to apply;
determine a present state of a manual steering controller controllable by a driver;
based on the obtained maximum steering torque and the determined state of the manual steering controller, determine a maximum applicable steering torque;
ascertain a maximum permissible velocity of the vehicle at which the vehicle is guidable along the curved driving trajectory with application of the determined maximum applicable steering torque; and
control the vehicle, by the processor, to reduce the vehicle velocity responsive to the ascertainment of the permissible velocity.

8. A non-transitory computer readable medium on which are stored instructions that are executable by a processor and that, when executed by the processor, cause the processor to perform a method for adapting a vehicle velocity for a vehicle, the method comprising:
determining a required steering torque for guiding the vehicle along a curved driving trajectory;
obtaining a maximum steering torque an automatic steering controller of the vehicle is able to apply;
determining a present state of a manual steering controller controllable by a driver;
based on the obtained maximum steering torque and the determined state of the manual steering controller, determining a maximum applicable steering torque;
ascertaining a maximum permissible velocity of the vehicle at which the vehicle is guidable along the curved driving trajectory with application of the determined maximum applicable steering torque; and
controlling the vehicle to reduce the vehicle velocity responsive to the ascertainment of the permissible velocity.

9. The computer readable medium of claim 8, wherein the controlling is performed by supplying a control signal for reducing the velocity of the vehicle responsive to a current velocity of the vehicle being greater than the permissible velocity.

10. The method of claim 6, wherein the combining is performed conditional upon that the determined control of the manual steering controller is in a direction of the required steering torque.

11. The method of claim 1, wherein the determining of the present state of the manual steering controller includes determining whether the manual steering controller is being controlled, and, responsive to a result of the determination being that the manual steering controller is not being controlled, the maximum applicable steering torque is determined using the maximum steering torque the automatic steering controller of the vehicle is able to apply without consideration of a steering torque that can be supplied by the driver control of the manual steering controller.

12. The device of claim 7, wherein the processor is configured to:
respond to a result of the determination of the present state of the manual steering controller being that the manual steering controller is being manually controlled in a direction counter to the determined required steering torque by refraining from performing the control of the vehicle to reduce the vehicle velocity;
respond to the result of the determination of the present state of the manual steering controller being that the manual steering controller is being manually controlled in the direction of the required steering torque by determining the maximum applicable steering torque by combining (a) the maximum steering torque that the automatic steering controller of the vehicle is able to apply and (b) a steering torque able to be supplied by the driver control of the manual steering controller; and
respond to the result of the determination of the present state of the manual steering controller being that the manual steering controller is not being manually controlled by determining the maximum applicable steering torque using the maximum steering torque the automatic steering controller of the vehicle is able to apply without consideration of the steering torque that can be supplied by the driver control of the manual steering controller.

* * * * *